United States Patent [19]

Rowe et al.

[11] Patent Number: 5,406,847
[45] Date of Patent: Apr. 18, 1995

[54] SUPERCONDUCTING GYROSCOPE

[75] Inventors: David A. Rowe, Torrance; Binneg Y. Lao, Rancho Palos Verdes, both of Calif.

[73] Assignee: Sierra Monolithics, Inc., Redondo, Calif.

[21] Appl. No.: 210,085

[22] Filed: Mar. 16, 1994

Related U.S. Application Data

[63] Continuation of Ser. No. 784,932, Nov. 1, 1991, abandoned.

[51] Int. Cl.$^6$ ............................................. G01P 3/44
[52] U.S. Cl. ....................................... 73/504; 73/505; 324/248; 505/843; 505/846
[58] Field of Search ............... 73/504, 505, 510; 324/248; 505/843, 846, 842

[56] References Cited

U.S. PATENT DOCUMENTS

| | | | |
|---|---|---|---|
| 3,657,927 | 4/1972 | Tyson | 73/505 |
| 4,225,818 | 9/1980 | Gallop et al. | 505/846 X |
| 4,403,189 | 9/1983 | Simmonds | 324/248 |
| 5,058,431 | 10/1991 | Karwacki | 73/505 |
| 5,066,637 | 11/1991 | Cerdonio et al. | 324/248 X |

OTHER PUBLICATIONS

Barnett, S. J., "Magnetization By Rotation," The American Physical Society, Second Series, vol. VI, No. 2, Jun., 1915, pp. 171–172.
Barnett, S. J., "Magnetization By Rotation," The Physical Review, Second Series, vol. VI., No. 4, Oct., 1915, pp. 239–270.
Brady, R. M., "A Superconducting Gyroscope With No Moving Parts," *IEEE Transactions on Magnetics*, vol. MAG–17, No. 1, Jan. 1981, pp. 861–862.
Kim, B. Yoon and Shaw, Herbert John, "Fiber–Optic Gyroscopes," *IEEE Spectrum*, Mar. 1986, pp. 54–60.
Bonaldi, M., et al., "Inertial and Gravitational Experiments With Superfluids: A Progress Report," *Proceedings of the Fourth Marcel Grossmann Meeting on General Relativity*, Elsevier Science Publishers B.V., 1985, pp. 1309–1317.
Lockhart, James M., et al., "Superconducting Thin–Film Gyroscope Readout for Gravity Probe–B," *IEEE Transactions on Instrumentation and Measurement*, vol. IM–36, No. 2, Jun. 1987, pp. 170–174.

*Primary Examiner*—Hezron E. Williams
*Assistant Examiner*—Helen C. Kwok
*Attorney, Agent, or Firm*—Irell & Manella

[57] ABSTRACT

A superconducting gyroscope of the present invention includes a circuit which produces a magnetic field which is synchronous with the rate of rotation experienced by the gyroscope, a sensing circuit for converting the synchronous magnetic field into an electric signal, a first shield made of superconducting material for performing shielding of external stray fields, and a second shield disposed inside the first shield and made of superconducting material for expelling trapped residual magnetic flux. The synchronous magnetic field producing circuit includes a magnetic core shaped in a toroid with an air gap. The magnetic core may alternatively be formed in meandering shape by a plurality of separate magnetic core members with a plurality of air gaps therebetween. The sensing circuit includes at least one SQUID which can be directly coupled to the magnetic core. The sensing circuit may also include a superconducting pick-up coil surrounding a portion of the magnetic core for picking up the synchronous magnetic field and producing a London field, and an input coil magnetically coupled to the SQUID. The SQUID and the magnetic core and/or other elements can be fabricated on a single substrate or chip.

30 Claims, 6 Drawing Sheets

SUPERCONDUCTING GYROSCOPE

This application is a continuation of application Ser. No. 07/784,932, filed Nov. 1, 1991, now abandoned.

FIELD OF THE INVENTION

The present invention relates to a novel method and system for providing directional or orientational information for an object such as a plane or a boat. More particularly, the present invention relates to a superconducting gyroscope.

BACKGROUND OF THE INVENTION

When an object such as a boat or a plane is rotating or turning, a gyroscope can measure the rate of turning and the angle turned. Such information, when fed into a navigational control, can help ensure that the object maintains the correct heading at all times.

Conventional gyroscope systems include magnetic compasses, rotating wheel or sphere gyroscopes, laser gyroscopes, and fiber-optic gyroscopes. A rotating wheel gyroscope is basically a spinning top which, when properly supported, will maintain its axis of rotation fixed at all times.

A laser gyroscope has two counter-travelling laser beams in an annular ring resonant cavity. Under rotation around an axis perpendicular to the plane of the ring, the optical paths of the two beams differ, causing a corresponding difference in the frequencies of the two beams. The frequency difference is measured to determine the rate of rotation.

A fiber-optic gyroscope has a spool of optical fiber with counter-travelling laser beams of a fixed frequency in the fiber. The two beams emerging from the fiber are interfered with each other and their relative phase difference is measured. The beam paths differ under rotation, causing a phase change to occur. The phase change is proportional to the measured rate of the rotation. A good general discussion of fiber-optic gyroscopes is set forth in the article "Fiber-Optic Gyroscope," *IEEE Spectrum,* March, 1986, p.54.

Each of the above conventional gyroscopes contains significant limitations. In rotating wheel or sphere gyroscopes, the use of moving parts limits their applications to low-acceleration low dynamic platforms. Laser gyroscopes are expensive and require precision optical parts and fragile optical components. Fiber-optic gyroscopes are potentially low cost, but they are prone to relatively low accuracy due to photon shot noise.

In an attempt to overcome the limitations of conventional gyroscope systems, superconducting gyroscopes have been studied for some years. General discussions of superconducting gyroscopes are contained in the article "A Superconducting Gyroscope With No Moving Parts," *IEEE Trans. Magnetics,* Vol. 36, p. 170 (1981), and in the article "Superconducting Thin Film Gyroscope Readout For Gravity Probe-B," *IEEE Trans. Inst. & Mers.,* Vol. 36, p. 170 (1987).

From superconducting physics, it is known that if a superconductor element is rotated with an angular velocity of the superconducting electrons on the surface of the superconductor lag behind in the rotation slightly and create a uniform London field $B_L$ in the body of the superconductor. The London field can be expressed by the equation:

$$B_L = 2m\omega/q \quad (1)$$

where m is the electron mass and q is the absolute value of the electron charge.

Equation (1) indicates that the London field vector $B_L$ is linearly proportional to the rotation vector $\omega$. This suggests that from a measurement of the London field, the amount of rotation the superconductor is undergoing synchronously with the moving object can be determined. However, because the London field is very small, it is hard to measure accurately. Additionally, the London field can be easily interfered with by external stray fields.

It is also known that if an infinitely long cylindrical ferromagnetic core is rotated with an angular velocity of $\omega$, a Barnett field is generated in the core due to the so-called Barnett moment associated with the rotation. The Barnett field can be expressed by the equation:

$$B_B = 2m\omega/qg' \quad (2)$$

where g' is the gyromagnetic ratio of the ferromagnetic material and is typically close to 1.9.

In principle, either of the effects described above can be used in the design of a rotation rate measurement device. The Barnett field and the London field can be measured by a Superconducting Quantum Interference Device ("SQUID"), which is one of the most sensitive magnetic field sensors. In order to make a practical gyroscope, the external fields due to magnetic field sources such as the earth have to be shielded so as not to interfere with $B_L$ and $B_B$. The earth's magnetic field is normally many orders of magnitude stronger than $B_L$ or $B_B$.

A typical example of such measurement devices is suggested by the article "Inertial and Gravitational Experiments with Superfluids: A Progress Report," *Proceedings of the 4th Marcel Grossman Meeting on General Relativity,* Elsevier Science Publishers B.V., #1312 (1986). This device includes a long ferromagnetic cylindrical core for providing a Barnett field, a superconducting pick-up coil surrounding the long magnetic core for picking up the Barnett field and the London field, a SQUID which is magnetically coupled to an input coil connected to the pick-up coil for measuring the sum of the Barnett field and the London field due to the rotation of the system, and a superconducting shield around the entire device for preventing the measurement system from being interfered with by outside signals.

This device, however, has several problems which makes it unsuitable for practical use. The long magnetic rod occupies a large space. In addition, there is always some minute trapped flux inside the superconducting shield. The trapped flux will induce spurious signals known as microphonic noises in the pick-up coil when there are vibrations between the superconducting shield and the magnetic core. Furthermore, the use of a pick-up coil and an input coil will reduce detection efficiency due to the energy loss in the dual-coil signal conversion process. The noise problem and energy loss result in a high minimum detectable rotation rate and low measurement signal-to-noise ratio. In summary, such devices are undesirable because they have a large size, high noise level and resultant poor accuracy.

SUMMARY OF THE INVENTION

The present invention comprises a superconducting gyroscope for measuring the amount and rate of rotation of a platform corotating with the gyroscope. The gyroscope is compact in size, easy to manufacture and has a high sensitivity. The superconducting gyroscope of the present invention includes a magnetic core with a synchronous magnetic field which is linearly proportional to the rate of rotation of the corotating platform. A sensing circuit detects the synchronous magnetic field and converts it into an electrical signal. Shielding elements shield the gyroscope from other fields. The magnetic core is configured in a magnetic loop and has at least one air gap for providing a Barnett field. In an alternative embodiment of the present invention, the magnetic core is shaped in a toroid with an air gap.

The sensing circuit comprises a superconducting pick-up coil surrounding a portion of the magnetic core. The superconducting pick-up coil senses the Barnett field and produces a London field therein. An input coil is connected to the superconducting pick-up coil for magnetically coupling the superconducting pick-up coil to a circuit that converts the sensed magnetic fields into a voltage.

The shielding elements preferably include at least one superconducting shield for expelling external fields and at least one additional superconducting shield, disposed inside the first superconducting shield, for minimizing the effect of the trapped residual flux.

In an alternative embodiment of the present invention, the sensing circuit preferably includes at least one SQUID which is preferably disposed directly around a part of the magnetic core means so as to enhance the signal detection efficiency.

In another alternative embodiment, the magnetic core may be formed in a meandering shape by a plurality of separate magnetic core members with a plurality of air gaps therebetween. In each of the air gaps, a small superconducting tube may be provided to prevent interaction between the separate core members and confine the magnetic flux path.

In accordance with another alternative embodiment of the present invention, the magnetic core and the sensing circuit can be easily fabricated on a single substrate or chip.

The superconducting gyroscope of the present invention has a number of advantages. An important advantage is that the sensitivity and the accuracy of the measurement system can be significantly enhanced while at the same time the superconducting gyroscope can be made in a compact size or in a highly integrated fashion. In so doing, the superconducting gyroscope system of the present invention minimizes the measurable rotational rate for a given system volume. The superconducting gyroscope of the present invention can substantially eliminate external magnetic fields without side-effects to the measurement of rotational rate, thereby increasing the accuracy.

These and other advantages of the present invention will become apparent after studying the following descriptions of the present invention.

DETAILED DESCRIPTION OF THE PREFERRED EMBODIMENT

Figure 1:
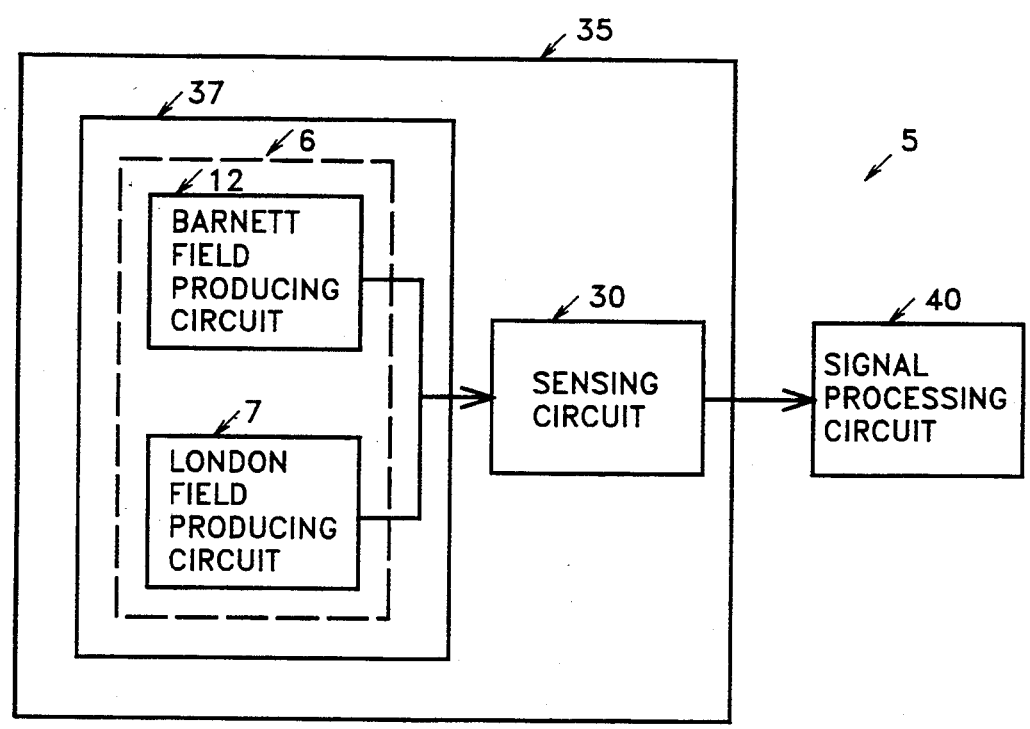
FIG. 1 is a functional block diagram representation of a superconducting gyroscope constructed in accordance with a preferred embodiment of the present invention.

Referring now to FIG. 1, a superconducting gyroscope 5 constructed in accordance with the present invention is shown. The superconducting gyroscope 5 comprises a synchronous magnetic field producing circuit 6 for producing a magnetic field synchronous with the rotation of an object to which the superconducting gyroscope 5 is attached and related to the rotation rate of the object. A sensing circuit 30 senses the synchronous magnetic field produced. A superconducting shield 35 encloses the synchronous magnetic field producing circuit 6 and the sensing circuit 30 in order to prevent electromagnetic interference from external magnetic fields. A superconducting shield 37 is disposed inside the superconducting shield 35 in close contact with the circuit 6 to minimize in the circuit 6 the trapped flux which may otherwise cause microphonic pick-up by a Barnett field producing circuit 12 or a London field producing circuit 7.

The synchronous magnetic field producing circuit 6 preferably includes a London field producing circuit 7 and a Barnett field producing circuit 12 having at least one magnetic core with a high magnetic permeability $\mu$. The superconducting gyroscope 5 further includes a signal processing circuit 40 for processing the signals sensed by the sensing circuit 30. The signal processing circuit can be disposed outside the shields 35 and 37.

The superconducting gyroscope 5 is located and mounted on or in an object whose rotation is to be measured. The superconducting gyroscope 5 is mounted in such a manner that there is no relative movement between the object and the superconducting gyroscope 5 system so that the rotation of the object can be detected.

The shields 35 and 37 may be shaped in the form of a cylinder, sphere, or cube. The superconducting shield 37 can be physically secured together with the magnetic core. The superconducting shield 37 prevents most of trapped flux from reaching the magnetic core. Thus, any trapped flux in the superconducting shield 35 will be attenuated by the inner shield 37 and not cause any significant induced microphonic signal in the circuit 12 or the circuit 7. To enhance the shielding effect, an additional $\mu$-metal shield may be arranged outside the superconducting shield 35.

If the superconducting elements used in the superconducting gyroscope 5 are made of low $T_c$ (critical temperature) superconducting material, such as niobium (Nb)-type material, these elements are normally required to be placed in a helium Dewar with liquid helium therein as cooling liquid, which is further put in a nitrogen Dewar with liquid nitrogen therein to reduce the temperature gradient between the helium Dewar and the outside (not shown), as is commonly known in the art. If the superconducting circuits and elements used in the system are made of recently-discovered high $T_c$ superconducting material, such as $YBa_2Cu_3O_7$, only a nitrogen Dewar with liquid nitrogen therein is needed. The Dewar can be a metal Dewar. If normal-temperature superconducting material is discovered, no Dewar and cooling liquid is necessary.

Figure 2:
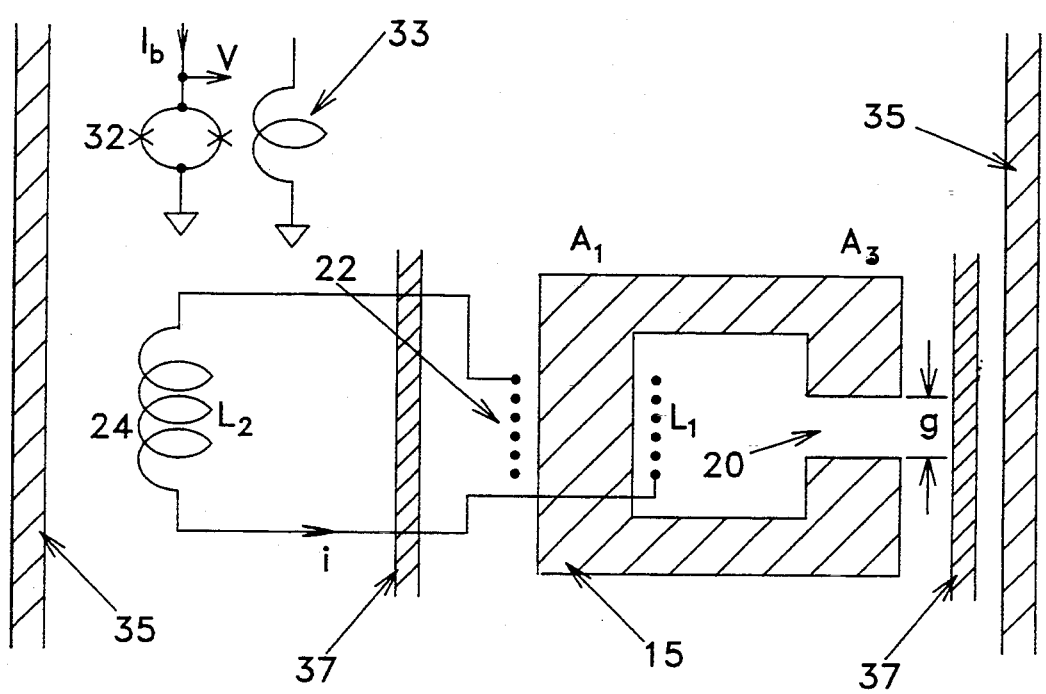
FIG. 2 is a cross sectional view of a preferred embodiment of the superconducting gyroscope of the present invention.

In actual practice, it is desirable to make a gyroscope that is compact. A small gyroscope not only saves space to make it suitable for practical use, but also makes the manufacturing easier and the cost lower. FIG. 2 shows the superconducting gyroscope 5 constructed in accordance with a preferred embodiment of the present invention which has compact dimensions. In this embodiment, the Barnett field producing circuit 12 comprises a magnetic core 15 which is advantageously configured in a toroid and has an air gap 20 for the flux return path so that a magnetic loop is formed. The magnetic core 15 is preferably ferromagnetic. The air gap 20 has a width g. The use of the air gap 20 and the loop configuration eliminate the requirement for a very long magnetic rod. Consequently, the superconducting shields 35 and 37 can be made very small. The superconducting shield 37 encloses the magnetic core 15 and can be in intimate contact with the magnetic core 15.

The London field producing circuit 7 of the superconducting gyroscope 5 includes a pick-up coil 22 surrounding a portion of the magnetic core 15 for picking up the Barnett field produced by the magnetic core 15. The Barnett field in the magnetic core 15 induces a signal current in the pick-up coil 22. Since the pick-up coil 22 is made of superconducting material, it will also generate a signal current related to the London field set-up by the shield 35 because the homogeneity of said London field is upset by the magnetic core. The total signal current is the sum of the two said signal currents. The pick-up coil 22 is connected to the sensing circuit 30, which comprises an input coil 24 that is magnetically coupled to at least one DC SQUID 32 for converting the sensed signal into a voltage output V. A DC SQUID consists of a superconductor ring interrupted by two Josephson junctions. For a constant current bias $I_b$ through the ring, the output voltage V is a periodic function of the magnetic field flux passing through the interior of the ring, as shown in FIG. 2. Then, the voltage V is applied to a DC output circuit. As shown in FIG. 2, the SQUID 32 and the input coil 24 may be fixed outside the superconducting shield 37, but inside the superconducting shield 35.

Figure 3:
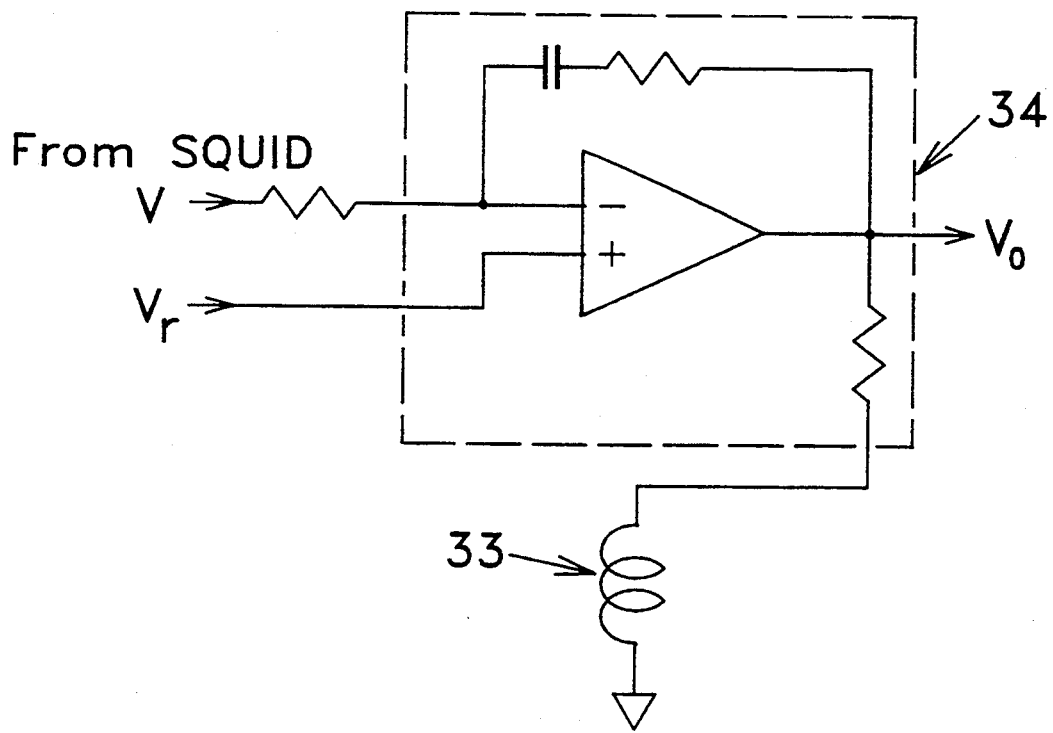
FIG. 3 is a schematic representation of a feedback and DC output circuit which can be used in the sensing circuit of a preferred embodiment of the present invention.

A portion of an exemplary embodiment of a sensing circuit 30 is shown in FIG. 3. The sensing circuit 30 is provided with a SQUID 32 (not shown), and a feedback circuit which includes a feedback coil 33 magnetically coupled to the SQUID 32 for a null detection. In this case, the SQUID 32 functions as a null detector. In a null detection, a field flux which is only a small fraction of a flux quantum can be measured with precision. In practice, the feedback coil 33 is driven by a DC output circuit which may include an integrator 34 which compares the output of the SQUID 32 with a reference voltage $V_r$.

The output $V_0$ of the sensing circuit 30 is supplied to the signal processing circuit 40 (FIG. 1). The signal processing circuit 40 may comprises an analysis circuit or the like. The analysis circuit may include a microprocessor, which performs tasks such as time averaging, digital filtering, etc.

In experiments conducted by using only low $T_c$ superconducting elements for the superconducting gyroscope 5, the measured current due to the Barnett field and the London field reached $3.2 \times 10^{-10}$ amps, under the following conditions:

$w = \frac{1}{2}$ RAD/sec
$N_1 = 18$ turns
$A_1 = 24$ mm$^2$
$L_2 = 2$ $\mu$H
$A_3 = A_1$
$L_1 = 3.5$ $\mu$H
$\mu \gg 1$ The tests show that the London flux in the superconducting shield 37 is constant but more concentrated in the core region $A_1$. The Barnett flux circulates the toroid magnetic core 15 and goes through the air gap 20. The bad effects from the superconducting shield 35 and the trapped residual external flux are substantially eliminated.

Figure 4:
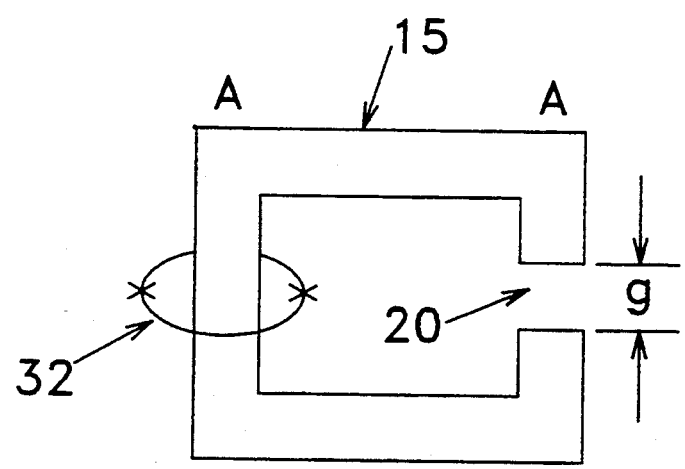
FIG. 4 is a schematic representation of an alternative embodiment of the superconducting gyroscope system of the present invention in which a SQUID is directly magnetically coupled to a magnetic core of the present invention.

An alternative and more efficient embodiment of the superconducting gyroscope of the present invention is shown schematically in FIG. 4. It is realized in the present invention that the use of the pick-up coil 22 and the input coil 24 to couple the flux of the magnetic core 15 to the SQUID 32 is very inefficient because a significant part of the signal energy is lost in the flux transformation. In order to reduce this problem, the SQUID 32 may be placed directly in the path of the magnetic core 15. That is, the SQUID 32 directly surrounds a portion of the magnetic core 15 so that a superior magnetic coupling is achieved.

The sensitivity of a measurement device can be best reflected by its signal-to-noise ratio. The signal energy and the noise energy in the superconducting gyroscope 5 of the present invention can be expressed by the following equations:

$$\text{Signal Energy } Es = gAB_w^2/2(1+\alpha)\mu. \qquad (3)$$

$$\text{Noise Energy } En = 4kT(\pi LC)^{\frac{1}{2}}(BW) \qquad (4)$$

Thus, the signal-to-noise energy can be written as:

$$S/N = (B_w)^2 (Ag^3)^{\frac{1}{2}}/\mu^{3/2} 8(1+\alpha)^{\frac{1}{2}}(\pi C)^{\frac{1}{2}} kT(BW) \qquad (5)$$

where g is the width of the air gap 20, A is the cross-sectional area of the magnetic core, $\alpha$ equals to the circumference of the core divided by $\mu g$, and $C = 0.1$ pF
$T = 77$K
$\beta = 0.533 \times 10^{13}$ in MKS units From equation (5), it can be seen that S/N is proportional to the square root of the cross section and the 3/2 power of the gap width g. Thus, it has a much stronger dependence on the gap width. This suggests that if the total volume of the magnetic core 15 (the volume being roughly a constant of order of unity times the product $A \times g$) is fixed, S/N can be increased by increasing g and decreasing A.

Another way to view this is to set S/N to 1. Then, the value of $\omega$ derived from equation (5) is the noise-equivalent rotation rate $\omega_N$, which can be expressed in (where $\beta = 0.533 \times 10^{13}$ MKS)

$$\omega_N = 0.21/A^{\frac{1}{2}}g^{\frac{1}{2}} deg/hour \text{ (1 Hz BW)} \qquad (6)$$

The value of $\omega_N$ represents the minimum detectable rotation rate. This equation indicates that minimizing $\omega_N$ for a fixed volume requires small A and large g.

It is desirable for a gyroscope to have a low minimum detectable rotation rate so that the sensitivity of the gyroscope is enhanced. However, the geometry of a magnetic core with a small A and a large g is not practical for implementation.

Figure 5:
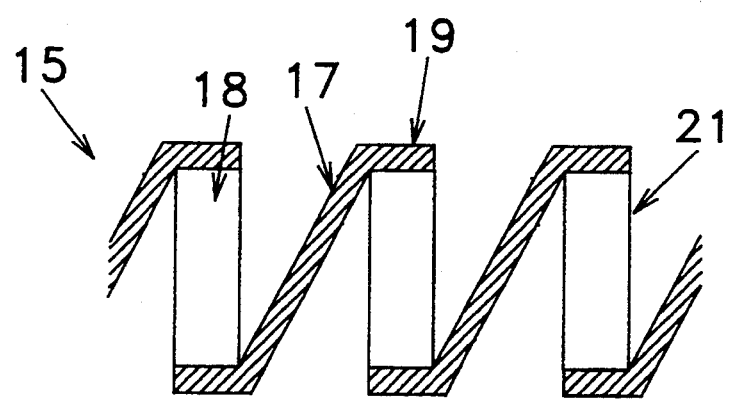
FIG. 5 is a cross-sectional view of a magnetic core constructed in accordance with an alternative embodiment of the present invention.

In accordance with another alternative embodiment of the present invention, the magnetic core 15 is formed by a plurality of separate magnetic core members which are shaped and arranged in such a way that a plurality of air gaps are provided and the total lengths of the magnetic core and the air gap g of the magnetic core are greatly increased, while the volume of the magnetic core is kept at a minimum. FIG. 5 shows a preferred structure for the magnetic core 15 in accordance with this alternative embodiment of the present invention, which causes the superconducting gyroscope to be more sensitive and more compact. The magnetic core 15 is configured in a meandering shape by a plurality of adjacent magnetic core members 17, each of which is shaped like a reversed "z," as indicated by the cross-hatched portions. The magnetic core members 17 are spaced apart from one another in such a manner that a plurality of air gaps 18 are formed among the short sections 19 of the adjacent magnetic core members 17.

In each air gap 18, a small superconducting tube 21 may be advantageously provided for containing the air gap 18 so as to confine the magnetic field inside the tube and prevent magnetic interactions between the adjacent magnetic core members. The superconducting tube 21 can be made by rolling a superconducting sheet with an insulating coating on one surface. The insulating coating prevents supercurrents from setting up azimuthally around the tube. Such current would interfere with the flux generated in the core members 17. The magnetic core members 17 are preferably made of magnetic fibers and the air gaps 18 are distributed among these short fibers.

With this geometry, it can be shown that $\omega_N$ is proportional to $d/V^{\frac{4}{3}}$, where d is the diameter of a fiber and V is the volume of the magnetic core. The following Table 1 gives the $\omega_N$, or the minimum detectable rotation rate for two d and V combination under the configuration of FIG. 5.

TABLE 1

| d | V | $\omega_N$ |
|---|---|---|
| .5 mm | 1 in³ | .7 deg/hr |
| .25 mm | 10 in³ | .062 deg/hr |

Figure 6:
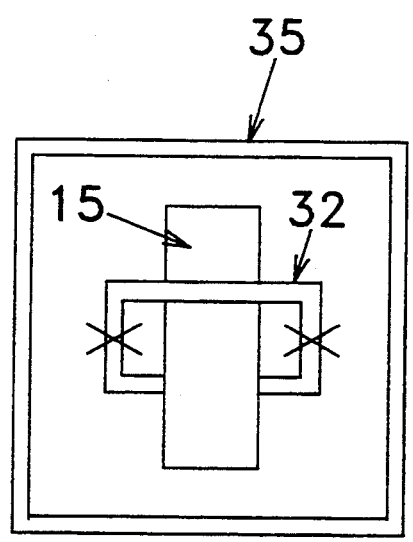
FIG. 6 is a schematic representation of a single substrate or chip on which a magnetic core and a SQUID are constructed in accordance with an alternative embodiment of the present invention.

As shown in FIG. 6, an even more compact superconducting gyroscope 5 can be constructed. In such a construction, the key elements of the superconducting gyroscope 5 of the present invention are fabricated on a single substrate or chip 35. The key elements would include the SQUID 32 and the magnetic core 15. Some or all of the other electronic circuits of the gyroscope system may also be fabricated on the same substrate.

What has been described above are the preferred embodiments of a system and method for providing a highly sensitive and compact superconducting gyroscope. It should be apparent that many modifications to the disclosed invention are possible without departing from the true spirit and scope of the invention.

What is claimed is:

1. A superconducting gyroscope located on or in an object for measuring the rotation of the object, comprising:
   means for producing a synchronous magnetic field which is synchronous with the rotation rate of the object,
   means for sensing said synchronous magnetic field produced, said sensing means including at least one Superconducting Quantum Interference Device (SQUID),
   first shielding means for preventing said synchronous magnetic field producing means and said sensing means from being interfered with by external magnetic fields, said first shielding means being made of superconducting material, and
   second shielding means for attenuating magnetic flux trapped between said first shielding means and said second shielding means, said second shielding means being disposed inside said first shielding means and enclosing said synchronous magnetic field producing means and said sensing means, said second shielding means made of superconducting material.

2. A superconducting gyroscope in accordance with claim 1, wherein said means for producing a synchronous magnetic field includes a magnetic core means for producing a Barnett field, said magnetic core means being shaped as a toroid and having an air gap.

3. A superconducting gyroscope in accordance with claim 2, wherein said magnetic core means is made of ferromagnetic material having a high magnetic permeability greater than one.

4. A superconducting gyroscope in accordance with claim 1, wherein said means for producing a synchronous magnetic field includes a magnetic core means for providing a Barnett field, said magnetic core means containing a plurality of magnetic core members spaced apart from one another and having a plurality of air gaps therebetween.

5. A superconducting gyroscope in accordance with claim 4, wherein said magnetic core means further includes a plurality of small tubes made of superconducting material, each of which is disposed in one of said air gaps between adjacent magnetic core members and is made insulating azimuthally by an insulating strip along the length of the tube.

6. A superconducting gyroscope in accordance with claim 2 or 4, wherein said means for producing a synchronous magnetic field further includes a means for generating a Barnett current induced by said Barnett field.

7. A superconducting gyroscope in accordance with claim 6, wherein said means for generating a Barnett current includes a pick-up coil surrounding at least a portion of said magnetic core means, said pick-up coil being made of superconducting material so as to further produce a London current therein in response to London field inhomogeneity caused by the presence of the magnetic core, and an input coil connected to said pick-up coil for magnetic coupling with said SQUID.

8. A superconducting gyroscope in accordance with claim 7, wherein said means for sensing said synchronous magnetic field further includes a feedback means so that said SQUID functions as a null detector.

9. A superconducting gyroscope in accordance with claim 1 or 4, wherein said means for producing a synchronous magnetic field and means for sensing said synchronous magnetic field produced are fabricated on a single substrate or chip.

10. A superconducting gyroscope in accordance with claim 1, further including means for processing signals sensed by said sensing means.

11. A superconducting gyroscope located on or in an object for measuring the rotation of the object, comprising:

means for producing a synchronous magnetic field which is synchronous with the rotation rate of the object, said means for producing said synchronous magnetic field including a magnetic core means for producing a Barnett field, said magnetic core means including a plurality of magnetic core members shaped and spaced apart from one another such that a plurality of air gaps between ends of said core members are formed, said magnetic core members for providing magnetic flux return paths, means for sensing said synchronous magnetic field produced, said sensing means being magnetically coupled to said means for producing a synchronous magnetic field, and means for shielding said superconducting gyroscope from external magnetic fields.

12. A superconducting gyroscope in accordance with claim 11, wherein said sensing means includes at least one Superconducting Quantum Interference Device (SQUID).

13. A superconducting gyroscope in accordance with claim 12, wherein said SQUID directly surrounds at least a portion of said synchronous magnetic field producing means.

14. A superconducting gyroscope in accordance with claim 11, wherein said synchronous magnetic field producing means further includes means for confining the magnetic flux return paths between the ends of any adjacent two of said magnetic core members.

15. A superconducting gyroscope in accordance with claim 11, wherein said magnetic field producing means and said sensing means are fabricated on a single substrate or chip.

16. A superconducting gyroscope in accordance with claim 11, wherein said means for sensing said synchronous magnetic field produced further includes a feedback and DC output circuit so that said SQUID functions as a null detector.

17. A superconducting gyroscope in accordance with claim 16, wherein said shielding means is made of superconducting material, and said superconducting gyroscope further includes additional shielding means made of superconducting material for attenuating magnetic flux trapped between said shielding means and said additional shielding means.

18. A superconducting gyroscope in accordance with claim 11, wherein said means for producing a synchronous magnetic field further comprises:

a pick-up coil means for generating a current induced by the Barnett field and for generating a current induced by an inhomogeneity of a London field caused by said magnetic core means, said pick-up coil means being made of superconducting material and surrounding at least a part of said magnetic core means, and an input coil means for magnetical coupling to said means for sensing said synchronous magnetic field, said input coil means being connected to said pick-up coil means.

19. A superconducting gyroscope in accordance with claim 11, wherein said magnetic core means contains a plurality of magnetic core members spaced apart from one another and having a plurality of air gaps therebetween.

20. A superconducting gyroscope in accordance with claim 11, wherein said magnetic core members are made of ferromagnetic fibers.

21. A superconducting gyroscope located on or in an object for measuring the rotation of the object, comprising:

magnetic core means for producing a synchronous magnetic field related to rotation of the object, said magnetic core means being configured such that a magnetic loop is formed with at least one gap as a magnetic flux return path, sensing means made of superconducting material for sensing said synchronous magnetic field produced, first shielding means for preventing said magnetic core means and said sensing means from being interfered with by external magnetic fields, said first shielding means enclosing said magnetic core means and said sensing means, and being made of superconducting material, second shielding means for attenuating magnetic flux trapped between said first shielding means and said second shielding means, said second shielding means being disposed inside said first shielding means, and being made of superconducting material.

22. A superconducting gyroscope in accordance with claim 21, wherein said magnetic core means is formed in a toroid shape with an air gap.

23. A superconducting gyroscope in accordance with claim 21, wherein said magnetic core means contains a plurality of magnetic core members spaced apart from one another and having a plurality of air gaps therebetween.

24. A superconducting gyroscope in accordance with claim 21, wherein said sensing means includes at least one Superconducting Quantum Interference Device (SQUID) surrounding at least a portion of said magnetic core means.

25. A superconducting gyroscope in accordance with claim 21, wherein said magnetic core means and said sensing means are fabricated on a single substrate or chip.

26. A method for measuring the rotation of an object, comprising the steps of:

producing a synchronous magnetic field which is synchronous with the rotation rate of the object by use of a magnetic core having one or more gaps provided as a magnetic flux return path, sensing said synchronous magnetic field by use of at least one Superconducting Quantum Interference Device (SQUID), preventing said magnetic core and said SQUID from being interfered with by external magnetic fields by use of a superconducting shielding element, eliminating trapped magnetic flux from said superconducting shielding means by use of a second superconducting shielding element.

27. The method in accordance with claim 26 wherein said step of producing a synchronous magnetic field further includes a step of upsetting the homogenous London field by use of a magnetic core means and a superconducting coil surrounding a portion of said magnetic core means, thereby generating a London current in response to said upset homogenous London field.

28. The method in accordance with claim 26 further including a step of directly magnetically coupling said SQUID to said magnetic core.

29. The method in accordance with claim 26 further including a step of fabricating said magnetic core and said SQUID on a single substrate or chip.

30. The method in accordance with claim 26, wherein said step of producing a synchronous magnetic field by use of a magnetic core means further includes a step of increasing the total length of the air gap on said magnetic core means and decreasing the diameter of said core means without increase of the volume of said core means.

* * * * *

UNITED STATES PATENT AND TRADEMARK OFFICE
CERTIFICATE OF CORRECTION

PATENT NO. : 5,406,847

DATED : April 18, 1995

INVENTOR(S) : David A. Rowe, et al.

It is certified that error appears in the above-indentified patent and that said Letters Patent is hereby corrected as shown below:

Column 1, line 63, after "of" insert -- $\omega$, --.

Column 6, line 47, after "S/N=$(B_w)^2$ $(Ag^3)^{1/2}/\mu^3/^2$ $8(1+a)^{1/2}(\pi C)^{1/2}kT(BW)$" delete -- (5) --.

Column 6, line 48, after "S/N=$(B_w)^2$ $(Ag^3)^{1/2}/\mu^3/^2$ $8(1+a)^{1/2}(\pi C)^{1/2}kT(BW)$" insert
-- $\beta\omega^2$ $(Ag^3)^{1/2}$ /(BW) --
and place at flush right -- (5) --.

Signed and Sealed this

Twenty-first Day of November, 1995

Attest:

BRUCE LEHMAN

Attesting Officer

Commissioner of Patents and Trademarks